United States Patent
Morgan et al.

[15] 3,679,728
[45] July 25, 1972

[54] PROCESS FOR PREPARING METHYLENEBISIMINODIACETONITRILE

[72] Inventors: Charles R. Morgan, Laurel, Md.; David A. Daniels, Kendall Park, N.J.

[73] Assignee: W. R. Grace & Co., New York, N.Y.

[22] Filed: Aug. 13, 1968

[21] Appl. No.: 752,186

[52] U.S. Cl..............................260/465.5, 260/465, 260/519
[51] Int. Cl.......................................................C07c 121/42
[58] Field of Search................................................260/465.5

[56] References Cited

FOREIGN PATENTS OR APPLICATIONS 974,787  11/1964  Great Britain......................260/465.5
1,159,959  12/1963  Germany...........................260/465.5

Primary Examiner—Joseph P. Brust
Attorney—Charles L. Harness and Kenneth E. Prince

[57] ABSTRACT

This invention is directed to a process for preparing methylenebisiminodiacetonitrile comprising reacting, in an aqueous system having a pH of about 0.9–3.9, ammonia, from an ammonia source selected from the group consisting of hexamethylenetetramine and ammonia sulfate (the hexamethylenetetramine also being a formaldehyde source), formaldehyde, and HCN to form methylenebisiminodiacetonitrile; separating, drying, and recovering the methylenebisiminodiacetonitrile, all as recited hereinafter.

11 Claims, No Drawings

PROCESS FOR PREPARING METHYLENEBISIMINODIACETONITRILE

This invention is in the field of methylenebisiminodiacetonitrile (MBIDAN) preparation.

Prior art methods for preparing MBIDAN are reviewed in British Patent No. 974,787.

The process of the instant invention, unlike the processes of the prior art, yields MBIDAN having a purity of at least 98–99.9 percent and a melting point of 84°–86° C.

In summary, this invention is directed to a process for preparing MBIDAN, comprising:

a. reacting at a temperature of about 15°–75° C. for about 5 minutes to 24 hours a reaction mixture consisting essentially of: (ii) an ammonia source selected from the group consisting of ammonium sulfate and hexamethylenetetramine (HMTA), the HMTA being both an ammonia source and a formaldehyde source; (iii) formaldehyde; (iv) HCN; and (v) a strong mineral acid to maintain the pH of the reaction mixture within the range of about 0.9–3.9, the ammonia source, formaldehyde, and HCN being present in amounts to provide a mole ratio of ammonia:formaldehyde:HCN 1:2.5–3:2–3, and the water being present in a ratio of about 2–20 parts by weight of water per part by weight of ammonia, to form a reacted mixture consisting essentially of MBIDAN and an acidic liquor;

b. adjusting the temperature of the reacted mixture to about 5°–50 C. if it is not already within this range to form a slurry consisting essentially of crude precipitated crystalline MBIDAN and an acidic mother liquor;

c. separating the crude crystalline MBIDAN from the mother liquor while maintaining the temperature of the slurry within the range of about 5°–50° C.; and d. recovering the separated methylenebisiminodiacetonitrile.

The reacted mixture referred to in steps (a) and (b) of the summary which is presented supra contains MBIDAN which formed when the reaction mixture reacted to form said reacted mixture, the reaction being represented by the equation:

$$2NH_3 + 5HCHO + 4HCN$$

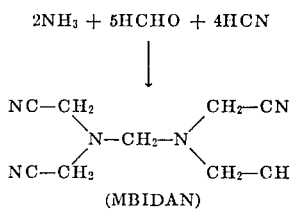

(MBIDAN)

Part or all of the MBIDAN may be dissolved in the acidic aqueous liquor present in the reacted mixture depending upon the concentration of the MBIDAN present in the reacted mixture and the temperature of the reacted mixture. Under the conditions prevailing in the process of the instant invention some MBIDAN will be present in the solid phase (i.e., present as precipitated crude MBIDAN) when the temperature of the reacted mixture is about 50° C. or lower. In other words if, in the process of this invention, the temperature of the reacted mixture is below about 50° C. said mixture will be a slurry consisting essentially of crude precipitated MBIDAN and an acidic mother liquor. Above about 50° C. it is, under some conditions within the scope of this invention, entirely possible for all of the MBIDAN to be present in the reacted mixture as dissolved MBIDAN. It is obvious that when the temperature of the reacted mixture is above the melting point of the crude MBIDAN present therein no solid MBIDAN will be present in said mixture.

In preferred embodiments of the process set forth in the above summary:

1. The separated MBIDAN is washed until it is substantially free of mineral acid (If desired the washed MBIDAN can be dried under a pressure of about 5–760 millimeters of mercury absolute pressure until the methylenebisiminodiacetonitrile is substantially free of moisture, the dry methylenebisiminodiacetonitrile having a purity of about 98–99 percent, a melting point of about 84°–86 C., and existing as white crystals. The washed MBIDAN can be dried in the solid state at about 15°–40° C.);

2. The MBIDAN is obtained in a yield of at least 70 percent of theory based on the reaction represented by the equation, ammonia being the limiting reactant;

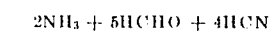

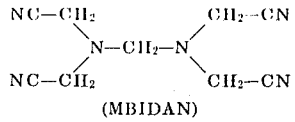

(MBIDAN)

3. The strong mineral acid is sulfuric acid;
4. The ammonia source is hexamethylenetetramine;
5. The ammonia source is ammonium sulfate;
6. The reaction mixture is reacted for 1–7 hours;
7. The ammonia source, the formaldehyde and the HCN are present in a mole ratio of ammonia:formaldehyde: HCN of about 1:2.5–2.75:2–2,2, and
8. The pH of the reaction mixture is maintained within the range of about 1.0–2.5.
9. The MBIDAN is dried in the solid state at about 15°–40° C., and
10. The MBIDAN is dried in the solid state at about 15°–40° C. under reduced pressure (ca. 2–250, preferably 5–50, millimeters of mercury absolute pressure).

It is an object of this invention to prepare MBIDAN from an ammonia source such as HMTA and $(NH_4)_2SO_4$.

It is another object of this invention to prepare pure (i.e. ca. 98–99.9 percent or purer) substantially dry i.e., containing about 0.5 percent, or 0.2 percent, or less moisture) crystalline MBIDAN in good to excellent yield.

Still other objects will be readily apparent to those skilled in the art.

The following examples are set forth by way of illustration, and it is understood that the instant invention is not to be construed as being limited by said examples or by the details therein.

EXAMPLE I

A 1 liter, four neck, round bottom flask (i.e., a reaction zone) was equipped with a magnetic stirring bar covered with an inert plastic, a condenser, pH electrodes, a pressure equalizing dropping funnel, and a thermometer as auxiliary apparatus. A 0.25 mole portion of HMTA (117 g. of an HMTA solution (30 percent HMTA in water)), a 1.04 mole portion of formaldehyde (84 g. of a 37 percent solution of HCHO in water), and 83 g. of ice were added to the reaction zone. The pH of the material in the zone was adjusted to 1.1 by adding sulfuric acid, and the resulting mixture was warmed to 40° C. The pH rose to 1.9 when the temperature of the mixture was increased to 40° C. A 2.25 mole portion (60.75 g.) of anhydrous liquid HCN was added to the reaction zone over a period of about 15 minutes while stirring the mixture therein and while maintaining the temperature of the mixture within the range of about 40° ± 3° C. As the HCN was added the pH of the mixture within the reaction zone fell rapidly to about 1.1. The mixture was stirred for an additional period of about 2.5 hours while maintaining the temperature thereof at about 40° ± 3° C. The mixture was then cooled to about 20° C. to form a system consisting essentially of a white precipitated crystalline produce (MBIDAN) and a liquid mother liquor. The mixture was removed from the flask, and filtered to separate the crystalline product from the mother liquor. The separated product was washed with cold water (water at ca. 0°

C.) to substantially free the MBIDAN product of mother liquor and mineral acid. The washed product was dried at about 20°–25° C. under reduced pressure (ca. 15–20 mm. of mercury absolute pressure), recovered, and weighed. The recovered product (white crystals melting at 84°–86° C.) weighed 83 grams representing a yield of about 82 percent of theory based on the HMTA charged.

Said white crystalline product was identified as substantially pure (99+ percent) MBIDAN by NMR (nuclear magnetic resonance).

Eample II

The general procedure of Example I was repeated; however, in this instance the procedure was modified by holding the temperature of the reaction mixture with the range of 40° ± 2° C. while adding the HCN and for 4.75 hours thereafter.

In this instance the yield of substantially pure MBIDAN was 87 g. (86 percent of theory).

EXAMPLE III

The general procedure of Example I was repeated; however, in this instance the procedure was modified by keeping the pH at 2–2.3 by adding a nearly saturated solution of sodium hydrogen carbonate as necessary before and during the addition of HCN. The mixture within the reaction zone was maintained at about 40° ± 3° C. for 6 hours after adding the HCN HCN.

The yield of substantially pure MBIDAN was 73 g. (72 percent of theory).

EXAMPLE IV

The general procedure of Example III was repeated; however, in this instance the procedure was modified by holding the temperature of the mixture within the reaction zone ate 50° ± 3° C. while adding the HCN and for 5 hours thereafter.

The yield of substantially pure MBIDAN was 72 g. (71percent of theory).

EXAMPLE V

The general procedure of Example III was repeated; however, in this instance the temperature of the mixture within the reaction zone was held at 60° ± 3° C. while adding the HCN and for 5 hours thereafter.

The yield of substantially pure MBIDAN was 78 g. (77 percent of theory).

Examples VI and VII, infra, show the importance of pH control.

EXAMPLE VI

The general procedure of Example I was followed; however, in this instance the following quantities of reactants were used (a) 117 g. of an aqueous HMTA solution, said solution analyzing 30 percent HMTA by weith (0.25 mole of HMTA); (b) 40 g. of an aqueous formaldehyde solution analyzing 37 percent HCHO by weight (0.49 moles of formaldehyde); and (c) 54 g. (2 moles of HCN). The pH of the mixture in the reaction zone was adjusted to 0.5 with sulfuric acid before adding the HCN and the pH remained below 0.5 while adding the HCN and during a reaction period of an hour subsequent to adding the HCN. Before adding the HCN, the temperature of the mixture within the reaction zone was adjusted to 60° ± 3° C. and the temperature was maintained at 60° ± 3° C. while adding the HCN and for an hour thereafter.

A 61 g. portion of a white crystalline material was recovered. This material was identified as nitrilotriacetonitrile. No MBIDAN was detected.

EXAMPLE VII

The general procedure of Example VI was repeated; however, in this instance the pH of the material in the reaction zone was adjusted to 4 with sulfuric acid before adding the HCN. During the addition of HCN the pH in the reaction zone was maintained at 4 by adding a nearly saturated solution of sodium hydrogen carbonate as required. Subsequent to adding the HCN the temperature of the material in the reaction zone was maintained at 60° ± 3° C. for 1.5 hours.

A 60 g. portion of a white crystalline solid melting at 61°–70° C. was recovered. It was found by NMR that this solid was a mixture of bout 95 percent MBIDAN and 5 percent iminodiacetonitrile.

EXAMPLE VIII

The reaction zone (four neck flask) and auxiliary apparatus was that used in Example I.

One-half mole (66 g.) of $(NH_4)_2SO_4$ was placed in the reaction zone and a 100 ml. portion of water was added thereto. Then a 2.5 mole portion (202 g. of a 37 percent solution of formaldehyde in water) was added to the reaction zone. THe pH of the resulting mixture was adjusted to 1.2 at which valve it remained while adding 2 moles of liquid anhydrous HCN to the mixture in the reaction zone. Before adding the HCN the temperature of the mixture in the reaction zone was adjusted to 50° C. and maintained at this temperature while adding the HCN and for a period of 5 hours thereafter. The mixture in the reaction flask was cooled to about 20° C. and filtered to separate a white crystalline precipitate (product) from the mother liquor from which the crystalline product had precipitated. The separated crystalline product was washed with ice water until said material was substantially free of sulfuric acid and mother liquor. The washed product was dried at about 25° C. under reduced pressure (ca. 30–35 mm. of mercury absolute pressure), recovered, and weighed.

The recovered product, which weighed 88 g. (87 percent of theory), was identified by NMR as 99.8 percent pure MBIDAN.

Hydrochloric acid, phosphoric acid, and nitric acid are also operative as strong mineral acid for adjusting the pH of the reaction mixture in the reaction zone in the process of this invention.

EXAMPLE IX

A number of runs were made to investigate the preparation of HMTA solution. In each run about 6 moles of formaldehyde (calculated as HCHO) was added as an aqueous formaldehyde solution to a round bottom flask equipped with a stirrer, a thermometer well, and an ammonia addition tube extending nearly to the bottom of the flask. The formaldehyde solutions used ranged in strength from about 20–50 percent HCHO with about 25–40 percent being the preferred concentration and about 37 percent being the optimum concentration. Anhydrous ammonia was passed into the flask via the ammonia tube generally while stirring the contents of the flask. The temperature of the mixture within the flask generally increased to about 90° C., or in some instances higher 13 depending on the rate of ammonia addition. Ammonia was added to bring the pH of the resulting mixture within the range of about 9.4–11 (preferably about 9.5–10.5). The resulting HMTA solution was adjusted to a concentration of about 30 percent HMTA by adding water thereto or by evaporating water therefrom as necessary.

EXAMPLE X

The general procedure of Example I was repeated; however, in this instance the separated MBIDAN was recovered without washing or drying. The recovered crude crystalline MBIDAN was of excellent quality but it was slightly wet with acidic mother liquor.

MBIDAN prepared according to the process of this invention has been used with excellent results to alkylate phenols. For example, p-cresol (a phenol) has been alkylated with at least one $—CH_2N=(CH_2CH)_2$ group by reacting the phenol with MBIDAN under substantially anhydrous conditions in the presence of a substantially non-oxidizing strong acid to form a salt of the acid and the alkylated phenol (p-cresol) and iminodiacetonitrile according to the reactions represented by the following equation:

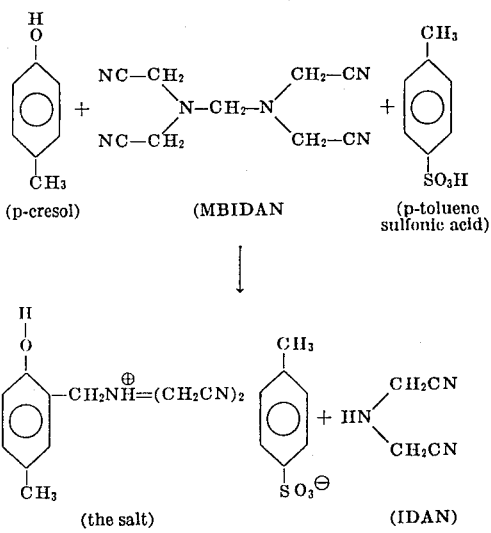

(p-cresol)    (MBIDAN)    (p-toluene sulfonic acid)

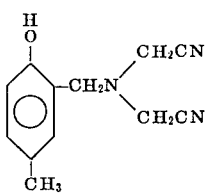

(the salt)    (IDAN)

the salt was hydrolyzed with sodium hydrogen carbonate solution to form the free alkylated phenol

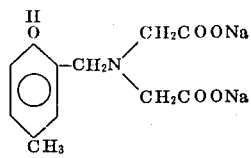

plus the sodium salt of p-toluene sulfonic acid.

The free alkylated phenol was then hydrolyzed by boiling with sodium hydroxide solution, until the evolution of ammonia ceased, to form a sodium salt of the alkylated phenol having the formula:

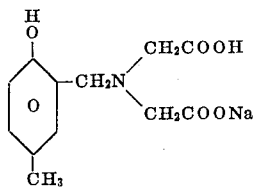

which was an excellent chelating agent for metallic ions including iron(II) and iron(III) ions. These chelates and iron and trace metal chelates formed from a half acid (said half acid being formed by treating said sodium salt with about 0.5 mole of sulfuric acid per mole of salt) having the formula

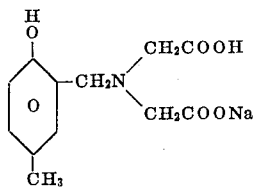

are excellent additives for adding iron and trace metals to soil — especially to alkaline and calcareous soils — the iron or trace metals being slowly released in the soils.

The salt and the half acid of the alkylated phenol are also excellent materials for removing brown stains caused by iron compounds from sinks, cloth, floors, and the like.

As used herein the term "percent" means parts per hundred by weight unless otherwise defined where used; however, as is well known to those skilled in the art, "percent yield" is a dimensionless number. As used herein the term "parts " means parts by weight unless otherwise defined where used.

As used herein the term "substantially free of moisture" means containing containing less than about 2 percent moisture.

As used herein the trrm "substantially free of mineral acid" means containingless than about 0.5 percent mineral acid and preferably less than about 0.1 percent mineral acid.

We claim:
1. A process for preparing methylenebisiminodiacetonitrile, comprising:
   a. reacting at a temperature of about 15°–75° C. for about 5 minutes to 24 hours a reaction mixture consisting essentially of; (i) water; (ii) an ammonia source selected from the group consisting of ammonium sulfate and hexamethylenetetramine, the hexamethylenetetramine being both an ammonia source and a formaldehyde source; (iii) formaldehyde; (iv) HCN; and (v) a strong mineral acid to maintain the pH of the reaction mixture within the range of about 0.9–3.9, the ammonia source, formaldehyde, and HCN being present in amounts to provide a mole ratio of ammonia: formaldehyde:HCN 1:2.5–3:2–3, and the water being present in a ratio of about 2—20 parts by weight of water per part by weight of ammonia, to form a reacted mixture consisting essentially of methylenebisiminodiacetonitrile and an acidic liquor;
   b. adjusting the temperature of the reacted mixture to about 5–50°C. if it is not already within this range to form a slurry consisting essentially of crude precipitated crystalline methylenebisiminodiacetonitrile and an acidic mother liquor;
   c. separating the crude crystalline methylenebisiminodiacetonitrile from the mother liquor while maintaining the temperature of the slurry within the range of about 5°–50° C.; and
   d. recovering the separated methylenebisiminodiacetonitrile.

2. The process of claim 1 in which the separated methylenebisiminodiacetonitrile is washed until it is substantially free of mineral acid.

3. The process of claim 2 in which the washed methylenebisiminodiacetonitrile is dried at about 10°–60° C. under a pressure of about 5–760 millimeter of mercury absolute pressure until the methylenebisiminodiacetonitrile is substantially free of moisture, the dry methylenebisiminodiacetonitrile having a purity of about 98–99 percent, a melting point of about 84°–86° C., and existing as white crystals.

4. The process of claim 3 in which the washed methylenebisiminodiacetonitrile is dried in the solid state at about 15°–40° C.

5. The process of claim 1 in which the methylenebisiminodiacetonitrile is obtained in a yield of at least about 70 percent of theory based on the ammonia.

6. The process of claim 1 in which the strong mineral acid is sulfuric acid.

7. The process of claim 1 in which the ammonia source is hexamethylenetetramine.

8. THe process of
1 in which the ammonia source is ammonium sulfate. -cm 9. The process of claim 1 in which the reaction mixture is reacted for 1–7 hours.

10. THe process of claim 1 in which the ammonia source, the formaldehyde and the HCN are present in a mole ratio of ammonia:formaldehyde:HCN of about 1:2.5–2.75:2–2.2.

11. The process of claim 1 in which the pH of the reaction mixture is maintained within the range of about 1.0–2.5.

* * * * *

Notice of Adverse Decision in Interference

In Interference No. 98,879 involving Patent No. 3,679,728, C. R. Morgan and D. A. Daniels, PROCESS FOR PREPARING METHYLENEBIS-IMINODIACETONITRILE, final judgment adverse to the patentees was rendered Nov. 28, 1975, as to claim 7.

[*Official Gazette March 23, 1976.*]